(12) United States Patent
Huang

(10) Patent No.: US 7,009,655 B2
(45) Date of Patent: Mar. 7, 2006

(54) METHOD AND SYSTEM FOR DIRECT RECORDING OF VIDEO INFORMATION ONTO A DISK MEDIUM

(75) Inventor: Qiang Huang, San Francisco, CA (US)

(73) Assignee: MedioStream, Inc., San Jose, CA (US)

( * ) Notice: Subject to any disclaimer, the term of this patent is extended or adjusted under 35 U.S.C. 154(b) by 375 days.

(21) Appl. No.: 10/202,999

(22) Filed: Jul. 23, 2002

(65) Prior Publication Data

US 2004/0017508 A1 Jan. 29, 2004

(51) Int. Cl.
*H04N 5/46* (2006.01)
(52) U.S. Cl. .................................... 348/441
(58) Field of Classification Search ............... 348/441, 348/443–449, 454, 455, 458–9
See application file for complete search history.

(56) References Cited

U.S. PATENT DOCUMENTS

| | | | | |
|---|---|---|---|---|
| 5,544,161 A | * | 8/1996 | Bigham et al. | 370/397 |
| 5,568,192 A | * | 10/1996 | Hannah | 348/222.1 |
| 6,285,398 B1 | * | 9/2001 | Shinsky et al. | 348/223.1 |
| 6,297,851 B1 | * | 10/2001 | Taubman et al. | 348/572 |
| 6,337,710 B1 | * | 1/2002 | Watkins | 348/180 |
| 6,370,198 B1 | * | 4/2002 | Washino | 375/240.26 |
| 6,587,155 B1 | * | 7/2003 | Xue | 348/595 |
| 6,781,596 B1 | * | 8/2004 | Falk | 345/600 |
| 2004/0001159 A1 | * | 1/2004 | Shen et al. | 348/441 |

* cited by examiner

Primary Examiner—Paulos M. Natnael
(74) Attorney, Agent, or Firm—Townsend and Townsend and Crew LLP

(57) ABSTRACT

A method for converting video information from an incoming format to an outgoing format using a process free from one or more intermediary files. The method includes receiving video information in a first format and receiving a desired output media format based upon a first input and a desired TV standard based upon a second input. The method decodes the video information in the first format to raw video information in an uncompressed format and directly resizes the raw video information in the uncompressed format into a size associated with the desired output media format and the desired TV standard. The method adjusts the uncompressed format in the size associated with the desired output media format and the desired TV standard to a frame rate associated with the desired TV standard and encodes the uncompressed format in the size and the frame rate into an elementary video stream. A step of multiplexing the elementary video stream with audio information in the desired output media format and the desired TV standard to form video and audio information in a presentation format based upon the desired output media format and the desired TV standard is included.

18 Claims, 4 Drawing Sheets

METHOD AND SYSTEM FOR DIRECT RECORDING OF VIDEO INFORMATION ONTO A DISK MEDIUM

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK.

Not Applicable

BACKGROUND OF THE INVENTION

The present invention is directed to processing video and audio information. More particularly, the invention provides a method and system for converting video information in an incoming format into an outgoing format, which is one of a plurality of formats using computer software and then writing the video information on a disk medium. But it would be recognized that the invention has a much broader range of applicability. For example, the invention can be applied to a variety of formats and information including audio information for a variety of applications such as fixed files, streaming video, captured streaming video and/or audio, any combination of these, and the like.

From a long time ago, people have been capturing visual images of moving or animated objects for storage and playback. Images were first captured as still on photographic papers, which were organized in stacks and flipped back to illustrate animation. Although somewhat successful, such images could not imitate a continuous and fluid motion of a moving picture. Later on, images were captured on photosensitive films, which were formed on thin plastic rolls. Such rolls were developed, and then played back using a projector, which included a light source that projected images from such roll through a lens onto a display screen. The projector mechanically scrolled through the roll to output images from the roll of film onto the screen to create a moving picture. The roll of film could be stored and later played back at anytime.

Other ways of distributing moving pictures include television. Television broadcasts moving pictures through one of a plurality of channels, which can be selected. Television has been broadcast through wireless ways, as well as hard cables. Moving pictures can also be broadcast or uni-cast from one location to another through a world wide network of computers, commonly called the Internet. Here, the Internet is a world wide "super-network" which connects together millions of individual computer networks and computers. The Internet is generally not a single entity. It is an extremely diffuse and complex system over where no single entity has complete authority or control. Although the Internet is widely know for one of its ways of presenting information through the World Wide Web (herein "Web"), there are many other services currently available based upon the general Internet protocols and infrastructure.

Video can also be transferred and output through the Internet. A company called RealNetworks, Inc. is a provider of media delivery and digital distribution solutions designed for the Internet. RealNetworks, Inc. has provided a way for video streaming media that enable the delivery and playback of multimedia content using a media player. Unfortunately, such media player is often large in size and difficult to download effectively. It often takes minutes to download such media player over a conventional modem device. Complex instructions also accompany the download and later installation of such media player, which makes the media player difficult to use for most Internet users. Accordingly, streaming media has had some success but still lacks wide spread utilization on the Internet. Other video players have also been used. Such video players include, among others, one manufactured and distributed by Microsoft Corporation of Redmond Wash. Others include Quicktime™ by Apple Computers, Inc. Such video players can often output certain video in a proprietary format. Alternative ways of distributing moving pictures includes the use of video tapes, disks (e.g., DVD, CD-ROM), and the like.

Unfortunately, many different types of sources for video now exist. Such sources include video files, captured video, analog video, streaming video, and others. Many different types of video outputs also exist. Such video output types include DVD, VCD, SuperVCD, and others. Accordingly, compatibility problems have plagued conventional video and video/audio technologies. Additionally, difficulties arise in editing video in a first format to a second format since tools have been limited and often require a great deal of technical skill to use such tools, which are cumbersome.

Specifically, conventional techniques have used more than one application to edit and convert video information. Here, multiple software applications are often needed to perform the editing and conversion process. Such applications are often complex and cannot be easily performed without a high degree of skill. Additionally, many of these applications are incompatible with each other further causing difficulty in the editing and converting process. Conventional techniques also take up a large amount of memory (e.g., disk space) and are extremely time consuming. Many other limitations with regard to conventional techniques can be found throughout the present specification and more particularly below.

From the above, it is seen that an improved technique for processing video information is desired.

BRIEF SUMMARY OF THE INVENTION

According to the present invention, techniques for processing video and audio information are included. More particularly, the invention provides a method and system for converting video information in an incoming format into an outgoing format, which is one of a plurality of formats using computer software and then writing the video information on a disk medium. But it would be recognized that the invention has a much broader range of applicability. For example, the invention can be applied to a variety of formats and information including audio information for a variety of applications such as fixed files, streaming video, captured streaming video and/or audio, any combination of these, and the like.

In a specific embodiment, the invention provides a method for converting video information (e.g., captured, streaming, file) from an incoming format to an outgoing format using a single pass conversion process (e.g. continuous) free from one or more intermediary files. The method includes inputting video information in a first format, e.g., captured, streaming, multimedia files. The method directly converts the video information in the first format to raw video information in an uncompressed format, e.g., RGB, YUV. The method inputs a desired output media format based upon a first input and inputs a desired TV standard (check on this) based upon a second input. Preferably, the first and second inputs are user inputs from a user interface. The method directly resizes the raw video information in the uncompressed format into a size associated with the desired output media format and the desired TV standard and also adjusts the uncompressed format in the size associated with the desired output media format and the desired TV standard to a frame rate associated with the desired TV standard. A step of directly processing the uncompressed format in the size and the frame rate into an elementary video stream is included. The method processes (e.g., multiplexes) the elementary video stream with audio information in the desired output media format and the desired TV standard to form video and audio information in a presentation format based upon the desired output media format and the desired TV standard.

In an alternative specific embodiment, the invention provides a system for converting video information from an incoming format to an outgoing format using an integrated computer software application. The integrated computer software application is provided on one or more memories, e.g., hard disk, Read Only Memory, Random Access Memory. A code is directed to receiving video information in a first format. A code is directed to receiving a desired output media format based upon a first input. A code is directed to receiving a desired TV standard based upon a second input. The software application also has a code directed to converting the video information in the first format to raw video information an uncompressed format using a decoding process and a code directed to resizing the raw video information in the uncompressed format into a size associated with the desired output media format and the desired TV standard. The application has a code directed to adjusting the uncompressed format in the size associated with the desired output media format and the desired TV standard to a frame rate associated with the desired TV standard and a code directed to processing the uncompressed format in the size and the frame rate into an elementary video stream. A code is also directed to processing the elementary video stream with audio information in the desired output media format and the desired TV standard to form video and audio information in a presentation format based upon the desired output media format and the desired TV standard. Depending upon the embodiment, there can also be one or more other computer codes for carrying out the functionality described at least throughout the present specification.

In a further alternative embodiment, the invention provides a method for converting video information from an incoming format to an outgoing format using a process free from one or more intermediary files. The method includes receiving video information in a first format and receiving a desired output media format based upon a first input and a desired TV standard based upon a second input. The method decodes the video information in the first format to raw video information in an uncompressed format and directly resizes the raw video information in the uncompressed format into a size associated with the desired output media format and the desired TV standard. The method adjusts the uncompressed format in the size associated with the desired output media format and the desired TV standard to a frame rate associated with the desired TV standard and encodes the uncompressed format in the size and the frame rate into an elementary video stream. A step of multiplexing the elementary video stream with audio information in the desired output media format and the desired TV standard to form video and audio information in a presentation format based upon the desired output media format and the desired TV standard is included.

Many benefits are achieved by way of the present invention over conventional techniques. For example, the present technique provides an easy to use process that relies upon conventional technology. The invention provides an integrated software application, which can be installed on a conventional personal computer or the like. In other embodiments, the invention allows a user to take any video information in any format and convert such video information into an outgoing format for writing onto a disk media, e.g., CD, DVD. Additionally, the invention is easy to use and efficiently processes video and/or audio information in a faster and more efficient way as compared to conventional video/audio editing and conversion applications. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DETAILED DESCRIPTION OF THE INVENTION

According to the present invention, techniques for processing video and audio information are included. More particularly, the invention provides a method and system for converting video information in an incoming format into an outgoing format, which is one of a plurality of formats using computer software and then writing the video information on a disk medium. But it would be recognized that the invention has a much broader range of applicability. For example, the invention can be applied to a variety of formats and information including audio information for a variety of applications such as fixed files, streaming video, captured streaming video and/or audio, any combination of these, and the like.

Figure 1:
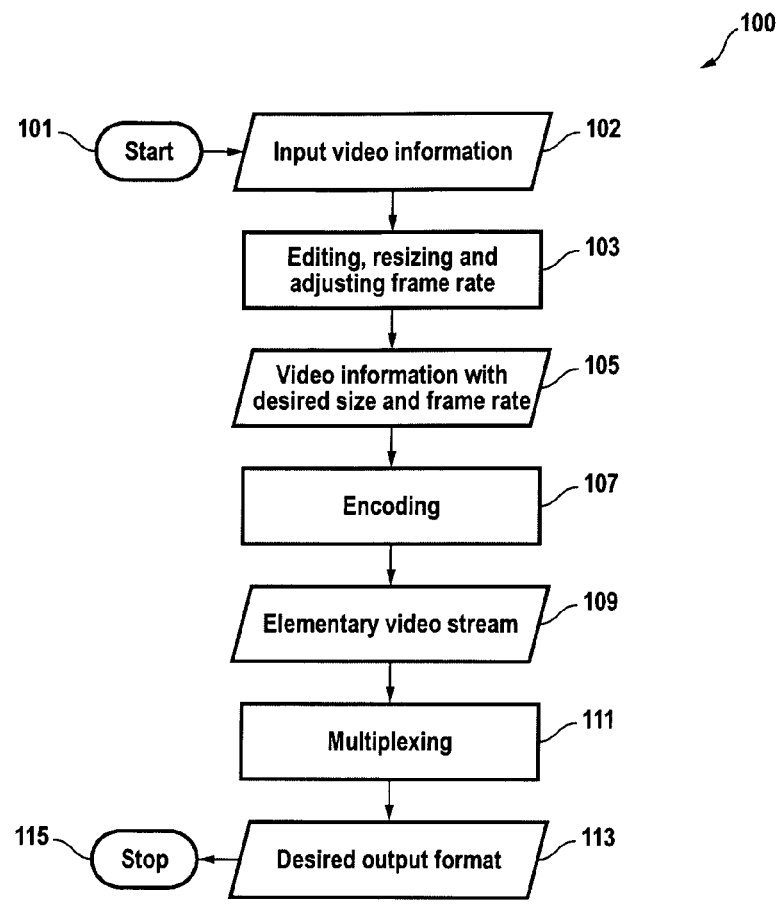
FIG. 1 is a simplified diagram of a conventional video editing and conversion method.

FIG. 1 is a simplified diagram of a conventional method 100 of video editing and conversion. This diagram is merely an example, which should not unduly limit the scope of the claims herein. One of ordinary skill in the art would recognize many other limitations, variations, and modifications. As shown, the method begins with start, step 101, which carries out more than one process often requiring the use of intermediary files, which are often stored in memory. Video information is input, step 102. Here, the video information can be a multi-media file, such as AVI. The method edits, resizes, and adjusts (step 103) the frame rate of the video information. Here, conventional tools such as non-linear video editing software and others are used. The method outputs an intermediary file including the video information with desired size and frame rate 105. The intermediary file is often stored in memory, which takes spaces and is less efficient.

Next, the convention method performs an encoding process, step 107. The encoding process often includes use of conventional tools such as software or hardware encoder and others. The encoding process converts the file with desired size and frame rate to a selected output format, such as MPEG or others. After encoding, the method outputs an elementary video stream 109, which is also in an intermediary file. Such file is often stored.

The conventional method then adds audio information to the elementary video stream in a multiplexing process, step 111. The audio information is in a format such as PCM, MPEG-1, or Dolby Digital formats. Often times, the method uses conventional tools such as disc authoring software to perform the multiplexing process. The conventional method outputs a video/audio file 113 having a desired format. Such file is often stored. The method ends at stop, step 115. As show, the conventional method has many limitations. Depending upon the particular embodiment of the present invention, one or more of these limitations has been overcome by way of the present method and system described throughout the present specification and more particularly below.

A method according to an embodiment of the present invention is provided as follows:

1. Initiate conversion process;
2. Input video information;
3. Convert input video into uncompressed raw video;
4. Transfer uncompressed raw video without any intermediary files;
5. Process raw video to desired output format and TV standard;
6. Process audio information to desired output format;
7. Transfer video and audio in desired formats with any intermediary files;
8. Form desired audio/video output; and
9. Perform other steps, as desired.

As shown, the method performs a sequence of steps to convert video information into a desired format without any intermediary files of conventional techniques. Preferably, the video information can be in almost any format or any format. The output video information can also be in any desired format, depending upon the embodiment. These and other features of the present method can be found throughout the specification and more particularly according to the figures below.

A method according to an alternative embodiment of the present invention is provided as follows:

1. Initiate conversion process;
2. Input video information;
3 Input desired output format from a plurality of formats and input TV standard;
4. Convert input video into uncompressed raw video;
5. Transfer uncompressed raw video without any intermediary files;
6. Process raw video to desired output format and TV standard based upon response from input of desired output format and input of TV standard;
7. Process audio information to desired output format;
8. Transfer video and audio in desired formats with any intermediary files;
9. Form desired audio/video output; and
10. Perform other steps, as desired.

As shown, the method performs a sequence of steps to convert video information into a desired format without any intermediary files of conventional techniques. Preferably, the video information can be in almost any format or any format. The output video information can also be in any desired format, depending upon the embodiment. More preferably, the user selects the desired output format and TV standard using a user interface, e.g., graphical user interface. These and other features of the present method can be found throughout the specification and more particularly according to the figures below.

Figure 2:
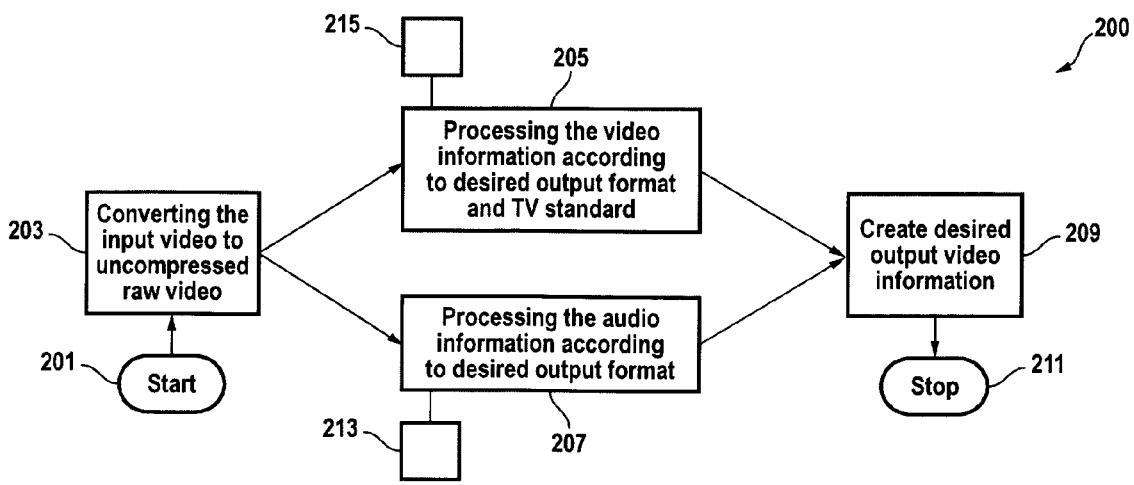
FIG. 2 is a simplified diagram of a digital video processing method according to an embodiment of the present invention.

FIG. 2 is a simplified diagram of a video processing method 200 according to an embodiment of the present invention. This diagram is merely an example, which should not unduly limit the scope of the claims herein. One of ordinary skill in the art would recognize many other limitations, variations, and modifications. As shown, the method begins at start, step 201, where an incoming video information is converted to an outgoing presentation format, which is different from the incoming video information. The method first inputs video information (not shown) from a video source, e.g., analog, digital video, captured video streaming video. The video information can be in almost any format or any format. The method initiates a conversion process of the video information from an incoming format to a raw video format, e.g, uncompressed. The raw video format is often RGB, YUV, or others. Preferably, the conventional process includes a decoding process. The method also separates audio information, if available, from the video information.

The method transfers the raw video raw video without any intermediary files to a resizing and framing process or processes, step 205. Here, the method directly resizes the raw video information in the uncompressed format into a size associated with the desired output media format and the desired TV standard. The method also directly adjusts the uncompressed format in the size associated with the desired output media format and the desired TV standard to a frame rate associated with the desired TV standard. The method processes the uncompressed format in the size and the frame rate into an elementary video stream. The method also processes the audio information (step 207) into a desired output format. Preferably, the method uses one or more encoding processes. The encoding process can form a desired output such as DVD, VCD, and others.

Next, the method transfers the video and audio information in desired formats without any intermediary files in preferred embodiments. The method forms the desired audio/video output (step 209) using at least a multiplexing process, which combines audio and video information together. The method stops at step 211. Preferably, the method inputs (step 215) video format information based upon a plurality of different formats into the processing step 205 to form the desired output video. Such video format information is preferably provided by way of user interface but can also be others. Additionally, the method inputs (step 213) audio format information based upon a plurality of different formats into the processing step 207 to form the desired output audio. Such audio format information is preferably provided by way of user interface but can also be others. Of course, one of ordinary skill in the art would recognize many other ways of inputting the format information for audio and video.

Although the above has been described in terms of a specific sequence of steps in one or more processes, it would be recognized that there could be many alternatives, variations, and modifications. For example, any of the above elements can be further separated or combined with each other or other elements. Preferably, the functionality of the above elements is carried out using computer software. Alternatively, some of the elements can be implemented in software or implemented in computer code in a combination of hardware and software. Alternatively, the above elements can be further integrated in computer code in hardware or software or implemented in computer code in hardware and software or the like. Depending upon the embodiment, further details of these steps are provided below according to the figures.

Figure 3A:
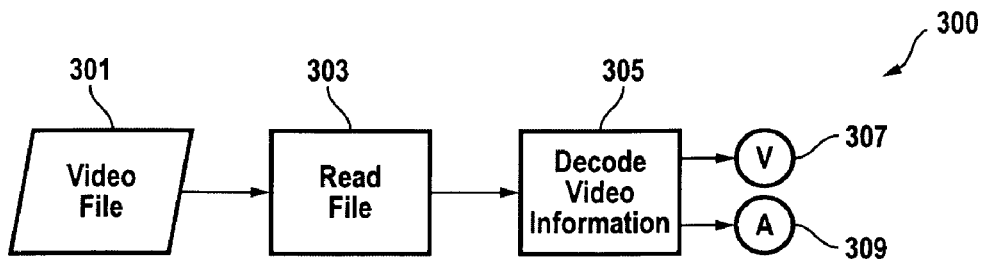
FIGS. 3A through 3C are more detailed diagrams of video input processes according to embodiments of the present invention.
Figure 3B:
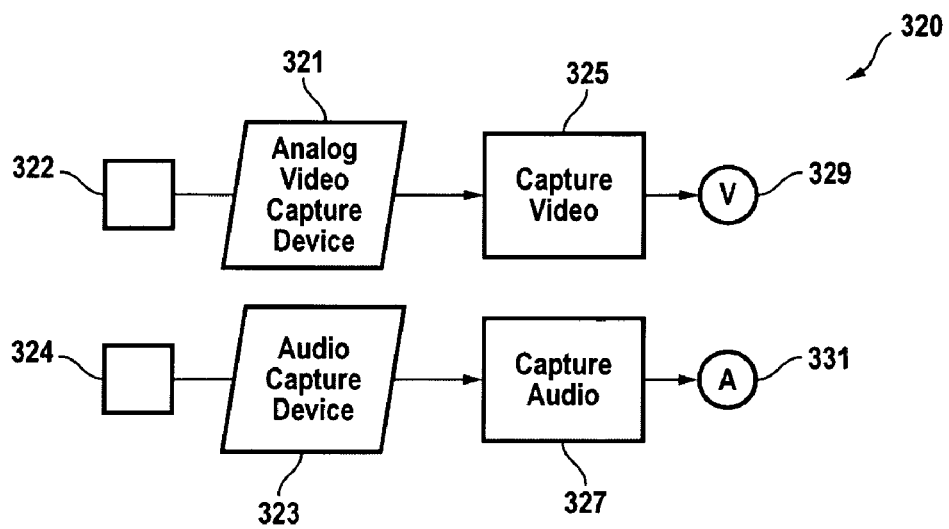
Figure 3C:
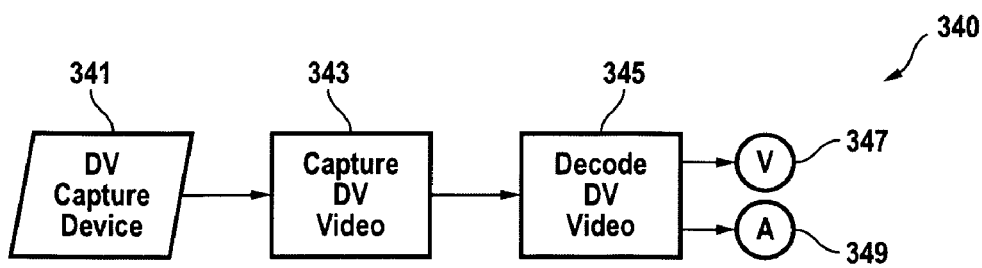

FIGS. 3A through 3C are more detailed diagrams of video input processes 300, 320, 340 according to embodiments of the present invention. These diagrams are merely examples, which should not unduly limit the scope of the claims herein. One of ordinary skill in the art would recognize many other limitations, variations, and modifications. As shown, any type or almost any type of video information can be input into the present method. Referring to FIG. 3A, the method inputs a video file 301. In a specific embodiment, the video file can be an AVI file, a QuickTime file, a Windows Media file, any combination of these, and others. The method reads the video file, step 303, to determine the type of file and format information. Depending upon the type of file and format information, the method decodes the video information, step 305. The decoded video information output (step 307) in an elementary or raw format such as RGB, YUV, and others. Audio information is also derived and separated from the video information, as shown by reference numeral 309.

In an alternative embodiment, the method includes providing captured video 321 and captured audio information 323. The captured video can be captured from any video capturing device. The video capturing device can include, among others, a video capture card connected to the bus of the computer, a USB video capture device. The video capturing device receives the video information from any analog video source, for example, a camcorder, a VCR, TV antenna, or others. The video capturing device digitizes the analog video information in a uncompressed raw video format. The audio capturing is provided using an audio capture device. The audio capture device can include, among others, a audio capture card connected to the bus of the computer, a USB audio capture device. The audio capturing device receives audio information from any audio source, for example, a camcorder, a VCR, TV antenna, microphone, or others. The audio capturing device digitizes the analog audio information in a uncompressed audio format. As merely an example, the captured video can be from a camera such as those manufactured by Sony, Panasonic, and others, as illustrated by reference numerals 322 and 324, respectively, for video and audio.

The method processes (step 325) the captured video information and also processes (step 327) the captured audio information. Preferably, the captured video information is processed by way of decoding to an elementary or raw video form 329 (e.g., uncompressed). The raw video form can include RGB, YUV, and others. The captured audio information is also processed by way of decoding to an elementary and/or uncompressed audio format, which includes PCM 331 (e.g., Pulse Code Modulation). The raw video and audio are outputted respectively to the next process steps without any intermediary files in preferred embodiments.

Alternatively, the method captures video information 341 using a digital video ("DV") capturing device, such as a high speed serial bus commonly called IEEE 1394. The high speed bus can be used to capture both audio and video information. The captured video and audio information processed 343 using the capturing device. The processed information is then processed through a decoding process 345, which yields an uncompressed or elementary or raw video 347 information and audio 349 information. Of course, one of ordinary skill in the art would recognize many other alternatives, variations, and modifications.

Figure 4:
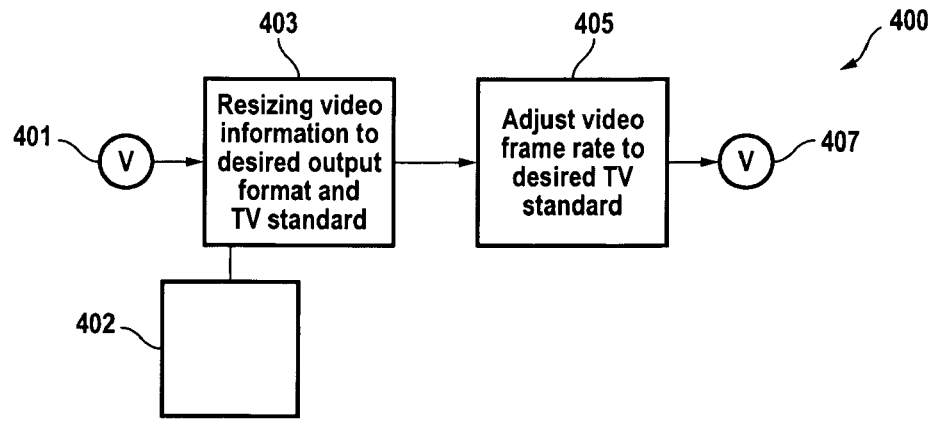
FIG. 4 is a more detailed diagram of a resizing and adjustment process according to an embodiment of the present invention.

FIG. 4 is a more detailed diagram of a resizing and adjustment process 400 according to an embodiment of the present invention. This diagram is merely an example, which should not unduly limit the scope of the claims herein. One of ordinary skill in the art would recognize many other limitations, variations, and modifications. As shown, video information in an elementary or raw form is derived from a prior process, step 401. The method resizes the video information to a desired output format and a desired TV standard. As merely an example, the desired output format and TV standard are provided by user inputs. Such user inputs can be selected by way of a custom graphical user interface, which is coupled to the present method. As merely an example, selected sizes are provided according to Table 1.

TABLE 1

| Media Format\ TV Standard | (National Television System Committee) NTSC Standard | (Phase Alternate Lines) PAL |
| --- | --- | --- |
| DVD | 720 × 480 | 720 × 576 |
|  | 352 × 480 | 352 × 576 |
|  | 352 × 240 | 352 × 288 |
| VCD | 352 × 240 | 352 × 288 |
| Super VCD | 480 × 480 | 480 × 576 |

As can be seen, the media format can be DVD, VCD, or Super VCD, among others. Depending upon the embodiment, DVD can include sizes of those noted above, and may also include others for NTSC and PAL. In alternative embodiments, VCD can include sizes as noted above for NTSC and PAL. Still further, Super VCD can include sizes as noted above for NTSC and PAL. Preferably, the media format and TV standard are provided by way of user input (step 402). Of course, there may also be other variations, modifications, and alternatives, depending upon the embodiment. Additionally, other types of display sizes can also be used depending upon the embodiment.

The method also adjusts (step 405) a frame rate of the video information. Depending upon the embodiment, NTSC includes a frame rate of 29.97 Vertical Frame Frequency and PAL includes a Vertical Frame Frequency of 25. The frame rate is adjusted in a separate process from the sizing step, which has been described. Alternatively, the frame rate can be adjusted in other ways, depending upon the specific embodiment. Outgoing video information, which has been sized and framed, exits the process, as provided by reference numeral 407.

Figure 5:
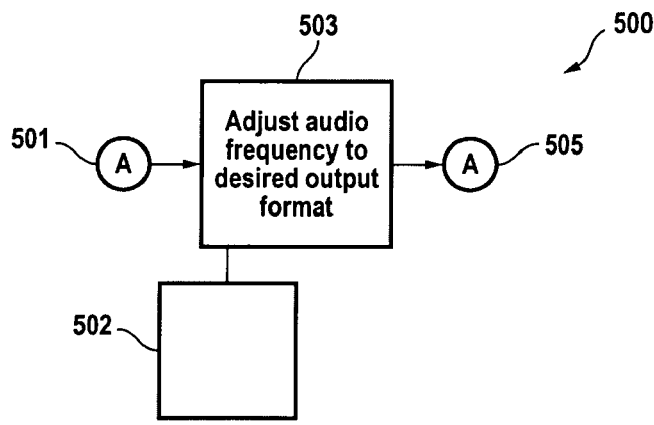
FIG. 5 is a more detailed diagram of a audio adjustment process according to an embodiment of the present invention.

The method also processes 500 audio information as illustrated in the simplified diagram of FIG. 5. This diagram is merely an example, which should not unduly limit the scope of the claims herein. One of ordinary skill in the art would recognize many other limitations, variations, and modifications. As shown, the method inputs uncompressed audio information 501, which is derived from a prior process, such as the one noted above, but can be others. In a specific embodiment, the method includes a step of adjusting a frequency of the audio information according to a desired output format. As merely an example, the desired format can be found in Table 2.

TABLE 2

| Media Format/Information | Format | Frequency |
|---|---|---|
| DVD | Uncompressed AC-3 MEPG-1 Layer 2 Audio | 48 kHz |
| VCD | MPEG 1 Layer 2 Audio | 44.1 kHz |
| Super VCD | MPEG 1 Layer 2 Audio | 44.1 khz |

As can be seen, the media format can be DVD, VCD, or Super VCD, among others. Depending upon the embodiment, the DVD format often uses a 48 kHz frequency rate. Alternatively, the VCD format often uses a 44.1 kHz frequency rate. As can be seen, the DVD and VCD uses MPEG 1 layer 2 Audio. Regardless of the final audio format, the audio is first converted to the desired frequency in this step. The adjusted audio is outputted to the next process, step 505. Preferably, the media format is provided by way of user input (step 502). Of course, there may also be other variations, modifications, and alternatives, depending upon the embodiment.

Figure 6:
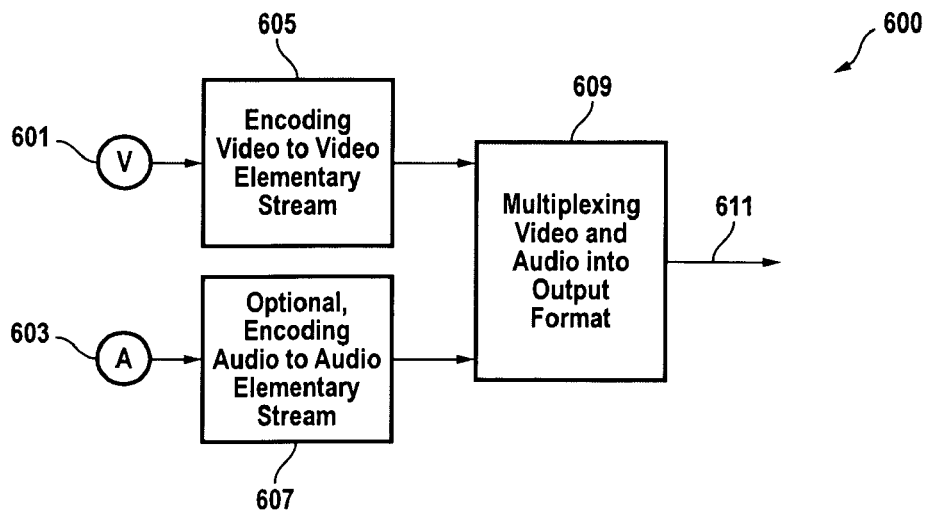
FIG. 6 is a more detailed diagram of a conversion process according to an embodiment of the present invention.

FIG. 6 is a more detailed diagram of a conversion process 600 according to an embodiment of the present invention. This diagram is merely an example, which should not unduly limit the scope of the claims herein. One of ordinary skill in the art would recognize many other limitations, variations, and modifications. Preferably, the method converts the raw video into a compressed elementary video, which is multiplexed with audio, to form an outgoing audio/video stream. The method receives uncompressed video 601 and encodes (step 605) such uncompressed video to from an elementary stream of video. Optionally, the method receives uncompressed audio and processes the audio using an encoding process (step 607) to form an elementary stream of audio information, which can be MPEG1 Layer 2 audio, AC-3 audio, among others. The elementary stream of audio information and the elementary stream of video information are multiplexed, step 609. The outgoing stream 611 is the multiplexed audio/video information. The outgoing stream can be in a variety of formats such as DVD, VCD, and Super VCD, among others.

Although the above has been described in terms of a specific sequence of steps in one or more processes, it would be recognized that there could be many alternatives, variations, and modifications. For example, any of the above elements can be further separated or combined with each other or other elements. Preferably, the functionality of the above elements is carried out using computer software. Alternatively, some of the elements can be implemented in software or implemented in computer code in a combination of hardware and software. Alternatively, the above elements can be further integrated in computer code in hardware or software or implemented in computer code in hardware and software or the like. Of course, the particular method will depend highly upon the application.

In an alternative embodiment, a method for adding video editing elements to the present invention can be outlined as follows:

1. Initiate conversion process;
2. Input video information;
3. Input video and audio media format information and TV standard;
4. Convert input video into uncompressed raw video;
5. Transfer uncompressed raw video without any intermediary files;
6. Process raw video to desired output format and TV standard based upon the inputted media format and TV standard;
7. Process audio information to desired output format based upon user input;
8. Transfer video and audio in desired formats with any intermediary files;
9. Perform editing process on the processed video in the desired output format and TV standard based upon selected user input;
10. Perform editing process on audio in desired output format based upon selected user input;
11. Form desired audio/video output; and
12 Perform other steps, as desired.

As shown, the method performs a sequence of steps to convert video information into a desired format without any intermediary files of conventional techniques. Preferably, the video information can be in almost any format or any format. The output video information can also be in any desired format, depending upon the embodiment. Preferably, editing features are also included. These and other features of the present method can be found throughout the specification and more particularly according to the figures below.

Figure 7:
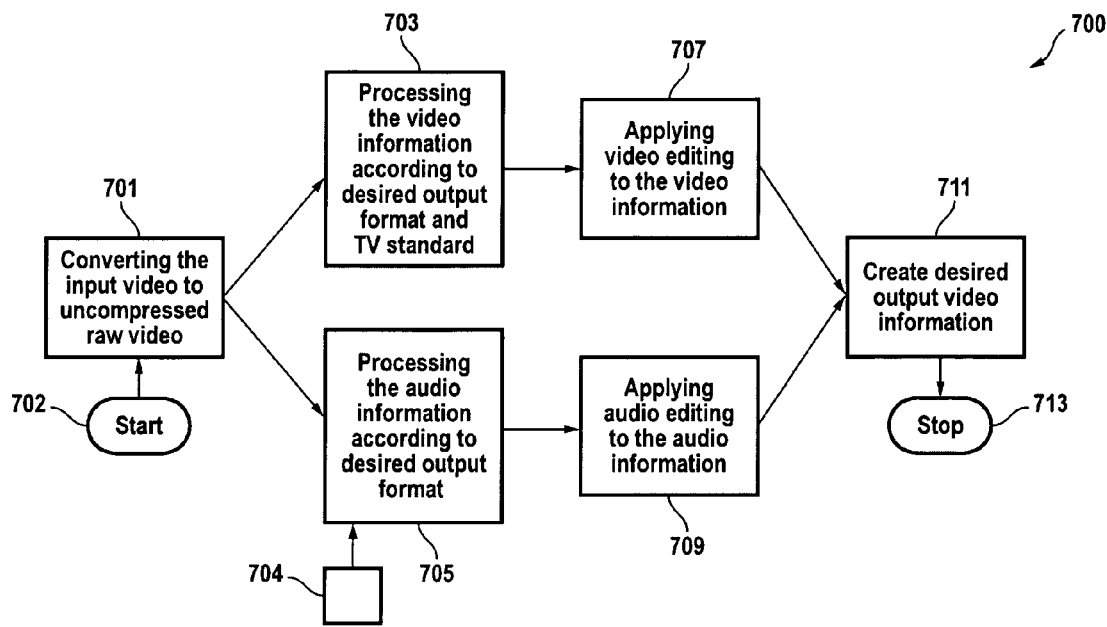
FIG. 7 is a simplified diagram of a video processing method including an editing process according to an embodiment of the present invention.

FIG. 7 is a simplified diagram of a digital video processing method 700 including an editing method according to an embodiment of the present invention. This diagram is merely an example, which should not unduly limit the scope of the claims herein. One of ordinary skill in the art would recognize many other limitations, variations, and modifications. As shown, the method begins at start, step 702. The method first inputs video information (not shown). The video information can be in almost any format or any format. The method initiates a conversion process (step 701) of the video information from an incoming format to a raw video format. The raw video format is often RGB, YUV, or others. Preferably, the conventional process includes a decoding process. The method also separates audio information, if available, from the video information.

The method transfers the raw video raw video without any intermediary files to a resizing and framing process or processes, step 703. Here, the method directly resizes the raw video information in the uncompressed format into a size associated with the desired output media format and the desired TV standard. The method also directly adjusts the uncompressed format in the size associated with the desired output media format and the desired TV standard to a frame rate associated with the desired TV standard. The method processes the uncompressed format in the size and the frame rate into an elementary video stream. The method also processes the audio information (step 705) into a desired output format. Preferably, the method uses one or more encoding processes. The encoding process can form a desired output such as DVD, VCD, and others.

Next, the method transfers the video and audio information in desired formats with any intermediary files in preferred embodiments. Preferably, the method includes a video editing process (step 707) to the video information. The editing process can be selected from fade, wipe, scroll, and others. Preferably, the method also includes a audio editing process (step 709) to the audio information. As merely an example, the audio editing process can include mixing with additional audio, fade, and others. The editing process is often input (step 704) by way of user input. The user input is provided through a graphical user interface. One of ordinary skill in the art would recognize many other limitations, variations, and modifications. The method forms the desired audio/video output (step 711) using at least a multiplexing process, which combines audio and video information together. The method stops at step 713. Although the above has been described in terms of a specific sequence of steps in one or more processes, it would be recognized that there could be many alternatives, variations, and modifications. For example, any of the above elements can be further separated or combined with each other or other elements. Preferably, the functionality of the above elements is carried out using computer software. Alternatively, some of the elements can be implemented in software or implemented in computer code in a combination of hardware and software. Alternatively, the above elements can be further integrated in computer code in hardware or software or implemented in computer code in hardware and software or the like. As merely an example, hardware used according to the present invention is provided in more detail below.

Figure 8:
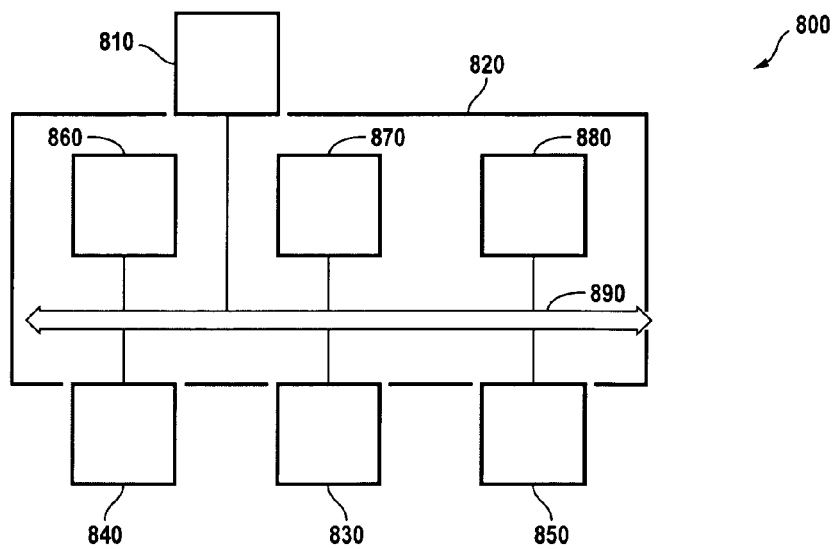
FIG. 8 is a simplified diagram of system hardware according to an embodiment of the present invention

FIG. 8 is a simplified diagram of system hardware 800 according to an embodiment of the present invention. This diagram is merely an example, which should not unduly limit the scope of the claims herein. One of ordinary skill in the art would recognize many other limitations, variations, and modifications. The system 800 includes a monitor 810, a computing system 820, a user input device 830, a network interface 840, and a keyboard 850. Computing system 820 preferably includes familiar components such as a processor 860, and memory storage devices, such as a random access memory (RAM) 870, a fixed disk drive 880, and a system bus 890 interconnecting the above components. User input device 830 may include a mouse, a trackball, a keyboard, a keypad, a joystick, a digitizing tablet, a wireless controller, a microphone, or other input devices.

Random access memory 870 and fixed disk drive 880 are mere examples of tangible media for storage of computer programs, e-mail messages, audio and/or video data, e-mail client programs, and code implementing embodiments of the present invention. Other types of tangible media include SRAM, floppy disks, optical storage media such as CD-ROMs and bar codes, semiconductor memories such as flash memories, read-only-memories (ROMs), ASICs, battery-backed volatile memories, and the like.

Network interface 840 may be any type of interface to a computer network. For example network interface 840 may be a modem, an Ethernet or fast Ethernet interface, a LocalTalk connection, a satellite or other wireless connection, or the like. As disclosed above, the computer network may be any type of network such as the Internet, an Intranet, an IPX network, private tunnel, local area network (LAN), WAN, and the like.

In a preferred embodiment, computing system 820 includes a '586 class microprocessor running Windows2000TM. operating system from Microsoft Corporation of Redmond, Wash. Many other computer systems, such as MacOSTM from Apple Corporation, running upon G3 based microprocessors, or SolarisTM from Sun Microsystems or UNIX running upon a SPARCstation, and the like can also be used. The system above discloses examples of configurations that embody the present invention. It will be readily apparent to one of ordinary skill in the art that many system types, configurations, and combinations of the above devices are suitable for use in light of the present disclosure. Of course, the types of system elements used depend highly upon the application.

Computer software codes to carry out the functionality herein are provided in one or more memories.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A system for converting video information from an incoming format to an outgoing format using an integrated computer software application, the integrated computer software application being provided on one or more memories, the one or more memories including:
   a code directed to receiving video information in a first format;
   a code directed to receiving a desired output media format based upon a first input;
   a code directed to receiving a desired TV standard based upon a second input;
   a code directed to converting the video information in the first format to raw video information an uncompressed format using a decoding process;
   a code directed to resizing the raw video information in the uncompressed format into a size associated with the desired output media format and the desired TV standard;
   a code directed to adjusting the uncompressed format in the size associated with the desired output media format and the desired TV standard to a frame rate associated with the desired TV standard;
   a code directed to processing the uncompressed format in the size and the frame rate into an elementary video stream; and
   a code directed to processing the elementary video stream with audio information in the desired output media format and the desired TV standard to form video and audio information in a presentation format based upon the desired output media format and the desired TV standard.

2. The system of claim 1 wherein the first format is selected from a group consisting of: a digital file, a digital captured video stream, an analog captured video stream, and an internet video stream.

3. The system of claim 2 wherein the digital file is selected from a group consisting of: an AVI format an MPEG format, a DV format, a QuickTime format, Real Video format, Windows Media Player format.

4. The system of claim 1 wherein the uncompressed format is selected from a group consisting of: RGB, and YUV.

5. The system of claim 1 wherein the desired output media format is selected from a group consisting of: DVD, VCD, and Super VCD.

6. The system of claim 5 further comprising a code directed to inputting a quality setting based upon a third input when the desired output media format is DVD.

7. The system of claim 1 further comprising writing the video and audio information in the presentation format onto a disk media.

8. The system of claim 1 wherein the presentation format is selected from a group consisting of: VOB(Video Object for DVD), VCD MPEG1, and SuperVCD MPEG2.

9. The system of claim 1 wherein the code directed to processing of the elementary video stream with audio information comprises a code directed to perform a multiplexing process.

10. The system of claim 1 wherein the audio information is tuned to a desired frequency based upon the desired output media format.

11. The system of claim 10 wherein the desired frequency is selected from a group consisting of: 48 kHz for DVD, 44.1 kHz for VCD and SVCD.

12. The system of claim 1 wherein the codes directed to converting, resizing, and adjusting, and processing are codes directed to be performed free from one or more intermediary files.

13. The system of claim 1 further comprising a code directed to processing the raw video information based upon video editing information based upon user input.

14. The system of claim 1 further comprising a code directed to processing the audio information based upon audio editing information based upon user input.

15. The system of claim 1 wherein the code directed to processing into the elementary video stream is provided in code directed to an encoding process and the code directed to converting into the raw video information is provided in code directed to a decoding process.

16. The system of claim 1 further comprising a code directed to receiving video editing information based upon a third input.

17. The system of claim 16 further comprising a code directed to receiving audio editing information based upon a fourth input.

18. The system of claim 16 wherein the integrated computer software application is a single integrated application.

\* \* \* \* \*

(12) EX PARTE REEXAMINATION CERTIFICATE (10069th)

United States Patent
Huang

(10) Number: US 7,009,655 C1
(45) Certificate Issued: Mar. 4, 2014

(54) METHOD AND SYSTEM FOR DIRECT RECORDING OF VIDEO INFORMATION ONTO A DISK MEDIUM

(75) Inventor: Qiang Huang, San Francisco, CA (US)

(73) Assignee: Mediostream, Inc.

Reexamination Request:
No. 90/012,800, Feb. 21, 2013

No. 90/020,049, Mar. 1, 2013

Reexamination Certificate for:
Patent No.: 7,009,655
Issued: Mar. 7, 2006
Appl. No.: 10/202,999
Filed: Jul. 23, 2002

(51) Int. Cl.
*H04N 5/46* (2006.01)
(52) U.S. Cl.
USPC ................ 348/441; 348/E7.003; 386/E9.013; G9B/27.012
(58) Field of Classification Search
None
See application file for complete search history.

(56) References Cited

To view the complete listing of prior art documents cited during the proceedings for Reexamination Control Numbers 90/012,800 and 90/020,049, please refer to the USPTO's public Patent Application Information Retrieval (PAIR) system under the Display References tab.

*Primary Examiner* — Ovidio Escalante

(57) ABSTRACT

A method for converting video information from an incoming format to an outgoing format using a process free from one or more intermediary files. The method includes receiving video information in a first format and receiving a desired output media format based upon a first input and a desired TV standard based upon a second input. The method decodes the video information in the first format to raw video information in an uncompressed format and directly resizes the raw video information in the uncompressed format into a size associated with the desired output media format and the desired TV standard. The method adjusts the uncompressed format in the size associated with the desired output media format and the desired TV standard to a frame rate associated with the desired TV standard and encodes the uncompressed format in the size and the frame rate into an elementary video stream. A step of multiplexing the elementary video stream with audio information in the desired output media format and the desired TV standard to form video and audio information in a presentation format based upon the desired output media format and the desired TV standard is included.

At the time of issuance and publication of this certificate, the patent remains subject to pending reexamination control number 95/001,284 filed Dec. 18, 2009. The claim content of the patent may be subsequently revised if a reexamination certificate issues from the reexamination proceeding.

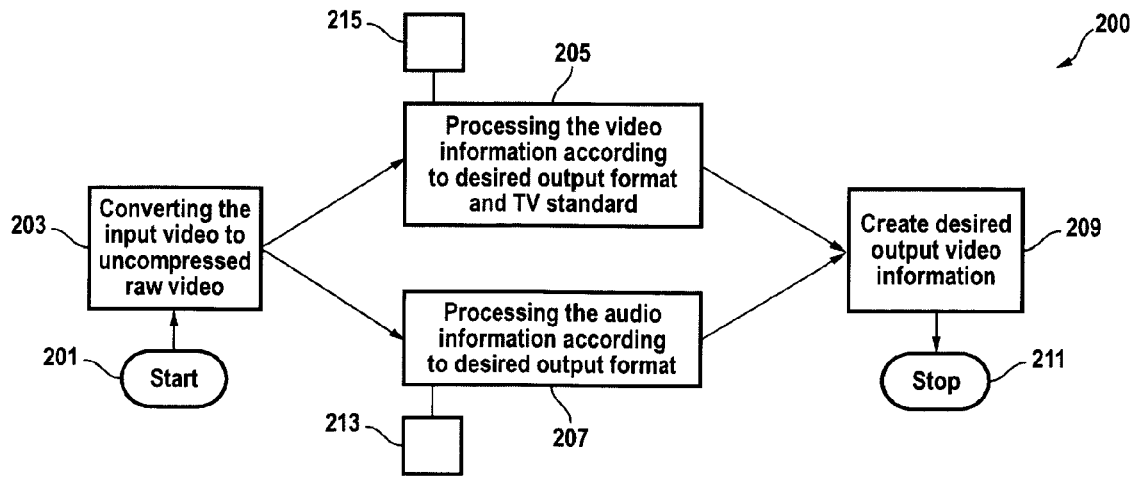

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 10 and 11 are cancelled.

Claims 1-9 and 12-18 were not reexamined.

\* \* \* \* \*

INTER PARTES REEXAMINATION CERTIFICATE (1204th)
United States Patent
Huang

(10) Number: US 7,009,655 C2
(45) Certificate Issued: Nov. 9, 2015

(54) METHOD AND SYSTEM FOR DIRECT RECORDING OF VIDEO INFORMATION ONTO A DISK MEDIUM

(75) Inventor: Qiang Huang, San Francisco, CA (US)

(73) Assignee: MEDIOSTREAM, INC., San Jose, CA (US)

Reexamination Request:
No. 95/001,284, Dec. 18, 2009

Reexamination Certificate for:
Patent No.: 7,009,655
Issued: Mar. 7, 2006
Appl. No.: 10/202,999
Filed: Jul. 23, 2002

Reexamination Certificate C1 7,009,655 issued Mar. 4, 2014

(51) Int. Cl.
*H04N 5/46* (2006.01)
*H04N 7/01* (2006.01)
*H04N 19/40* (2014.01)
*G11B 27/034* (2006.01)
*H04N 9/804* (2006.01)
*H04N 5/85* (2006.01)
*H04N 9/806* (2006.01)

(52) U.S. Cl.
CPC .............. *H04N 7/01* (2013.01); *G11B 27/034* (2013.01); *H04N 9/8042* (2013.01); *H04N 19/00472* (2013.01); *H04N 19/40* (2014.11); *G11B 2220/2545* (2013.01); *G11B 2220/2562* (2013.01); *H04N 5/85* (2013.01); *H04N 7/0127* (2013.01); *H04N 9/8063* (2013.01)

(58) Field of Classification Search
None
See application file for complete search history.

(56) References Cited

To view the complete listing of prior art documents cited during the proceeding for Reexamination Control Number 95/001,284, please refer to the USPTO's public Patent Application Information Retrieval (PAIR) system under the Display References tab.

*Primary Examiner* — Ovidio Escalante

(57) ABSTRACT

A method for converting video information from an incoming format to an outgoing format using a process free from one or more intermediary files. The method includes receiving video information in a first format and receiving a desired output media format based upon a first input and a desired TV standard based upon a second input. The method decodes the video information in the first format to raw video information in an uncompressed format and directly resizes the raw video information in the uncompressed format into a size associated with the desired output media format and the desired TV standard. The method adjusts the uncompressed format in the size associated with the desired output media format and the desired TV standard to a frame rate associated with the desired TV standard and encodes the uncompressed format in the size and the frame rate into an elementary video stream. A step of multiplexing the elementary video stream with audio information in the desired output media format and the desired TV standard to form video and audio information in a presentation format based upon the desired output media format and the desired TV standard is included.

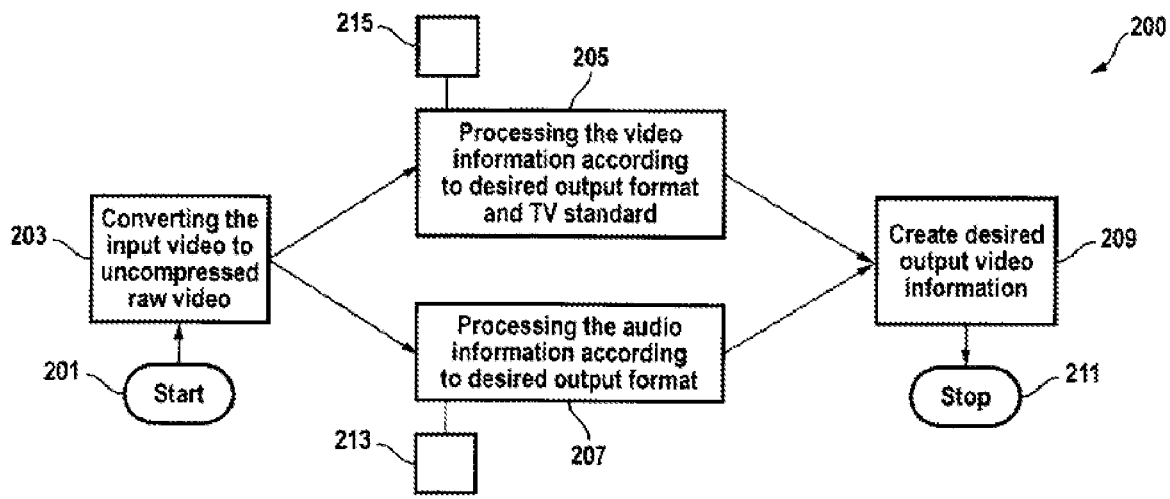

INTER PARTES REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 10 and 11 were previously cancelled.
Claims 1-9 and 12-18 are cancelled.

\* \* \* \* \*